GEORGE ADAIR AND J. F. POOL, OF MONROE, WISCONSIN.

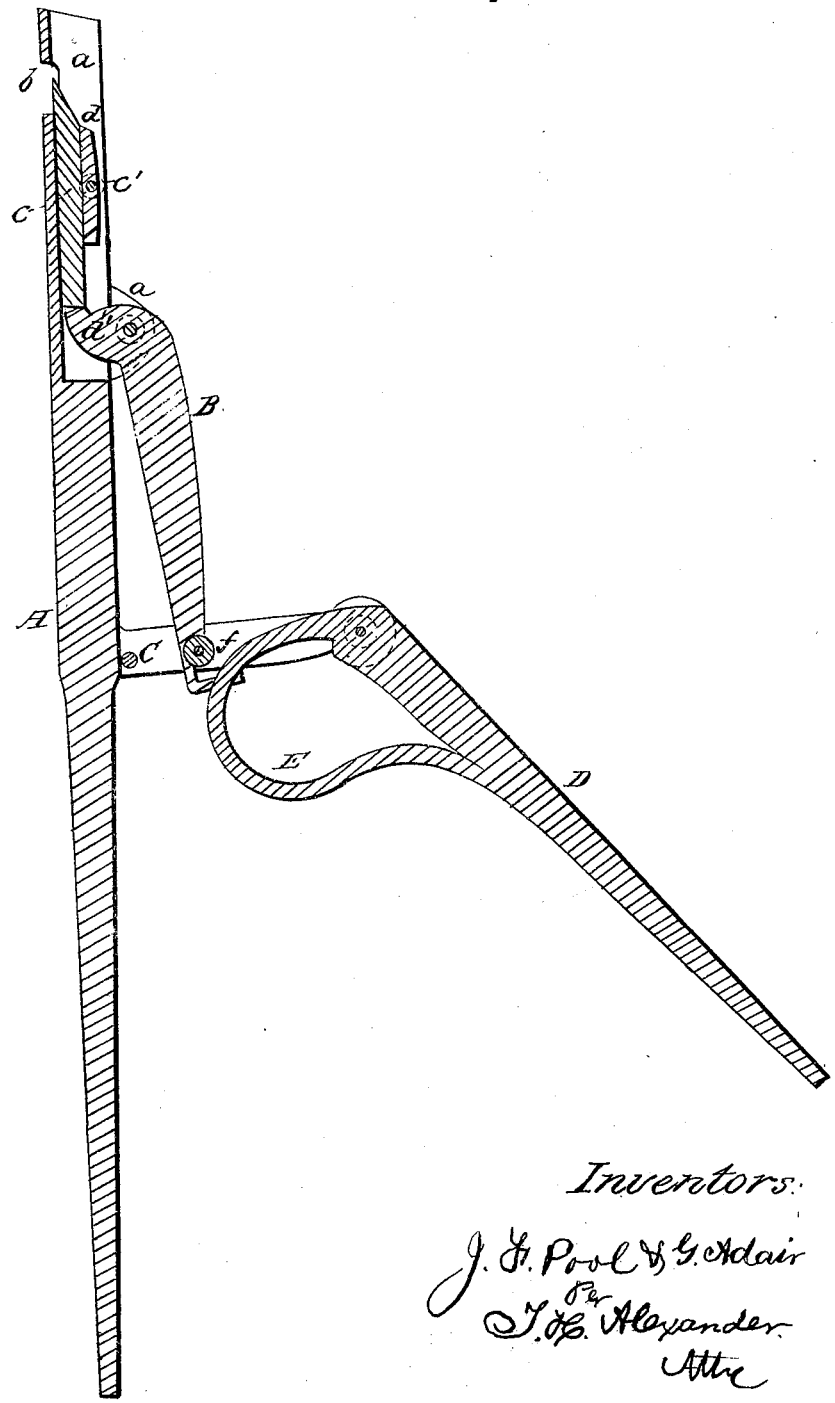

Letters Patent No. 89,267, dated April 27, 1869.

IMPROVED DEVICE FOR CUTTING BOLTS.

The Schedule referred to in these Letters Patent and making part of the same.

*To all whom it may concern:*

Be it known that we, GEORGE ADAIR and J. F. POOL, of Monroe, in the county of Green, and State of Wisconsin, have invented certain new and useful Improvements in Bolt-Trimmers; and we do hereby declare that the following is a full, clear, and exact description thereof, reference being had to the accompanying drawings, and to the letters of reference marked thereon, which form a part of this specification, and in which is represented a longitudinal section of our bolt-trimmer.

The nature of our invention consists in the employment of a cam, both ends of which are made solid with the handle, for the purpose of operating the lever, which is pivoted to the main bar of trimmer, and operates the knife, when constructed in the manner as will be hereinafter described.

To enable others skilled in the art to which our invention appertains, to make and use the same, we will now describe its construction and operation.

In the accompanying drawing—

A is a bar, which is made with a slot, $a$, on its forward upper end, and a mortise, $b$, opposite said slot, to receive the head of the bolt to be trimmed.

In the slot $a$ is placed the knife $c$, made as seen in the drawing, and retained in its place by the bar $d$, and screw-bolt and nut $c'$.

B represents a lever, made at one end with a shoulder, $d'$, and pivoted in the slotted projection $a'$, formed on the bar A. The other end of the lever B is slotted, and a roller, $f$, is pivoted in said slot, which comes in contact with the cam when the machine is operated.

On the end of the lever B beyond, the slot is made with a hook, $i$, as seen in the drawing, which passes over the cam.

C represents two bars, secured at right angles to the main bar A. In the upper end of these bars is pivoted the handle D, which is formed solid with the cam E.

The operation of our trimmer is as follows:

The bar A is placed in a horizontal position, and the mortise $b$ inserted over the bolt-head, then by operating the handle, the cam E forces the hooked end of the lever D down, which causes the shoulder $d'$ to strike the upper end of the knife, thereby trimming the bolt. As soon as the pressure from the handle is released, the knife resumes its original position.

Having thus described our invention,

What we claim as new, and desire to secure by Letters Patent, is—

The combination of the handle D and cam E with the lever B, the bar A, and knife $c$, all constructed, arranged, and operating substantially in the manner and for the purpose described.

In testimony that we claim the foregoing as our own, we affix our signatures in presence of two witnesses.

GEORGE ADAIR.
J. F. POOL.

Witnesses:
S. W. ABBOTT,
WM. GRAY.